Patented May 24, 1949

2,470,964

UNITED STATES PATENT OFFICE 2,470,964

ROSIN ACID ESTERS

Harold Wittcoff, Minneapolis, Minn., assignor to General Mills, Inc., a corporation of Delaware No Drawing. Application June 16, 1945, Serial No. 599,949

10 Claims. (Cl. 260—104)

The present invention relates to esters which are produced by the esterification of rosin acids with hydroxy compounds resulting from the condensation of formaldehyde with ketones. These condensation products of formaldehyde with ketones may contain a varying number of hydroxymethyl groups, depending on the extent of reaction. In addition, the ketone group may or may not be reduced to a hydroxyl group. In accordance with the present invention part or all of these hydroxyl groups may be esterified with a variety of rosin acids to produce esters of novel properties. These products include ester gums which are characterized by improved color, hardness and melting point. It is therefore a primary object of the present invention to provide novel esters of rosin acids with a hydroxy condensation product of formaldehyde and a ketone.

It is another object of the present invention to provide novel ester gum products which are esters of rosin acids with a polyhydroxy condensation product of formaldehyde and a ketone.

It is another object of the present invention to provide ester gums of improved color and hardness.

These and other objects of the invention will be more readily apparent from the following description, with particular reference to specific examples which are to be considered as illustrative only and not as limiting the invention.

In general, the invention involves the preparation of esters by the esterification of the usual rosin acids with hydroxy condensation products of formaldehyde with a ketone. These esters include a variety of compounds in view of the variation which is possible in the ketone used in the condensation, the extent of the condensation and accordingly the number of the hydroxyl groups present in the condensation product, the extent to which the hydroxyl groups are esterified and the nature of the rosin acids employed for esterification. Thus the ketones employed in the condensation to produce the hydroxy compound may be aliphatic or alicyclic, such as cyclohexanone, cyclopentanone, acetone, methyl ethyl ketone, diethyl ketone, mesityl oxide, diacetyl, acetonylacetone, diacetone alcohol, levulinic acid, and the like. The rosin acids may be any of the acids ordinarily employed in the preparation of ester gums, such as gum or wood rosin, pine oleorosin, sapinic acids, pimaric acids, abietic acid, and any of the other acids which ordinarily occur in gum or wood rosin and which may, in general, be termed as "gum colophony." All of these substances are contemplated by the term "rosin acid" as used herein and in the claims. There may also be used for esterification polymerized rosin, disproportionated rosin, hydrogenated rosin and the rosin portions of tall oil. These products are of superior properties and in particular some of the ester gums are characterized by very light color and accordingly may be used to produce varnish of very desirable light color. Moreover, these ester gums are very high melting and accordingly may be employed with oils ordinarily considered too "soft" to produce good varnishes. The so-called "soft" oils which may be cooked at high temperatures with the ester gums herein described include the drying or semidrying oils, such as linseed, dehydrated castor, soybean, perilla and poppyseed oil which do not ordinarily produce varnishes which dry rapidly to highly water resistant films. Moreover, the ester gums described herein are quite heat stable and may be employed in varnish cooking at high temperatures without substantial discoloration.

With reference to the preparation of the condensation products of formaldehyde and ketones, some of these have been recorded in the literature. However, improved methods of preparing these condensation products will be found in the examples of the present application and in the co-pending application of the present inventor Serial No. 599,947 filed June 16, 1945, now U. S. Patent 2,462,031, and entitled Condensation of ketones with formaldehyde. The formaldehyde employed may be in any suitable form, such as paraformaldehyde, trioxymethylene, or any other formaldehyde polymer which will liberate formaldehyde under the reaction condition. Since, however, the reaction is preferably carried out in aqueous solution it is preferred to employ the less expensive commercially available forms of formaldehyde such as formalin. In general a slight excess of formaldehyde is used. Thus, if the ketone contains six replaceable hydrogen atoms and a carbonyl capable of reduction, it is desirable to use 7.5 or 8.0 molar equivalents of formaldehyde rather than the 7.0 moles required theoretically. The condensation reaction results in a mixture of products which may be of varying degrees of hydroxylation and in some cases may be in the form of a sirupy liquid. It will be apparent that this mixture of condensation products may be used in that condition or individual hydroxy compounds may be isolated if desired.

If the sirup is not readily crystallizable, and if a pure crystalline condensation product is desired, it may be obtained in some instances by forming an acetal, ester, or other derivative which may subsequently be hydrolyzed to the free hydroxy compound. The formation of an acetal often takes place readily when the crude sirup is stirred with acetone. Usually there is sufficient acid present as a result of the method of preparation to catalyze acetal formation. If necessary, a small amount of acid catalyst, such as sulfuric acid, may be added. As an alternative, an acetal derivative may be obtained by heating the sirup in aqueous methanol with an aldehyde such as benzaldehyde and a small amount of mineral acid for a suitable period of time. The acetal such as the benzal derivative, may be isolated from the solution by filtration after which it may be purified by crystallization from a suitable solvent such as alcohol. The isolated acetal derivative may be converted to the hydroxy compound by treatment with a strong acid, such as hydrochloric acid. The volatile ketone or aldehyde may then be distilled off, leaving the pure hydroxy compound as a light-colored oil which crystallizes readily on cooling. Where the aldehyde liberated is as high boiling as benzaldehyde, the application of vacuum or the use of steam distillation is desirable.

The esterification with the rosin acid may be accomplished with either the crude sirup or with the isolated pure hydroxy compound. Likewise, it is possible to esterify directly the acetal, such as the benzaldehyde or acetone derivative. This may be accomplished under the influence of an acid catalyst, preferably oxalic acid, as it effects the least amount of discoloration. Other strong acidic catalysts, such as p-toluene-sulfonic acid and sulfuric acid, may likewise be used to catalyze the esterification reaction in which an acetal is used.

The ester gums may further be prepared according to any of the standard procedures used for this type of compound. As an example, any one of the rosin acid types indicated above may be heated until it is fluid. Thereafter, the alcohol may be added either in the crystalline form, as a sirup, or as an aqueous solution. The resulting mixture is stirred and heated under vacuum at a temperature in the region of 265° C. for a period of about one hour. Even when the time of heating in some cases is extended to four hours in order to produce an ester with low acid number, there still results a product of light color and high degree of transparency.

*Example 1*

In a vessel equipped with an agitator and a reflux condenser was placed 116 parts of acetone, 480 parts of formaldehyde in the form of paraformaldehyde and 1700 parts of water. Thereafter 56 parts of calcium oxide was added with stirring. The reaction mixture thereupon was heated to 50° C. whereupon external heating was discontinued. The exothermic nature of the reaction caused the temperature to rise to 90° C. whereupon the reaction mixture was cooled to room temperature. If desired, the same effect may be attained by maintaining the reaction mixture at a temperature of 50°–55° C. for one to three hours. The solution thereupon was treated with dilute sulfuric acid until it was barely acid to Congo red indicator. Oxalic acid solution was added to make the reaction mixture strongly acid to Congo red indicator and to precipitate the last traces of calcium ion. The easily filtrable precipitate of calcium sulfate and calcium oxalate was removed whereupon the aqueous solution was evaporated in vacuo. The almost water white sirup which resulted was treated with an organic solvent such as benzene and again evaporated in vacuo, the benzene serving to remove occluded water azeotropically. The sirup which resulted had a hydroxyl content of 28–30% and contained a substantial amount of an anhydroenneaheptitol which may be more accurately described as tetrahydro-3,3,5,5-tetrakis (hydroxymethyl)-4-pyranol.

In an appropriate vessel equipped with agitator and a device for applying vacuum was placed 400 parts of gum rosin of grade N which was heated under nitrogen to 230° C. after which 63 parts of the condensation product of acetone and formaldehyde as an 80% solution was added dropwise with stirring under nitrogen. The resulting reaction mixture was heated under vacuum at 265° C. for 3.5 hours. There resulted a product which was fairly light in color and which possessed the following physical properties:

| | |
|---|---|
| Acid number | 87.0 |
| Hydroxyl number | 99.9 |
| Melting point (capillary) °C | 94 |
| Melting point (ball and ring) °C | 96.5 |

It is significant that this high melting point was observed in spite of the relatively high acid and hydroxyl content of the product. The ball and ring melting point of a similar ester gum from glycerol was 76.4° C. and from sorbitol was 84.8° C.

*Example 2*

In an appropriate vessel equipped with agitator and reflux condenser was placed 392 parts of cyclohexanone, 660 parts of formaldehyde in the form of paraformaldehyde, 3500 parts of water, and 112 parts of calcium oxide. With stirring the temperature of the solution rose spontaneously to 55° C. whereupon the exothermic nature of the reaction was checked by external cooling. Thereafter the reaction mixture was heated and stirred at 50–55° C. for two hours. The reaction mixture after having been acidified to Congo Red paper with dilute sulfuric acid was filtered and desolvated to yield a sirup which crystallized readily on trituration with alcohol. Crystallization from absolute ethanol yielded a product melting at 130°–131° C. whose structure is indicated by I.

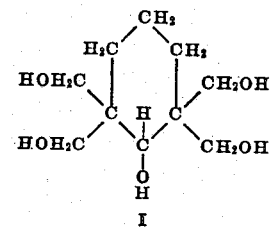

I

The procedure of the preceding example was employed using 330 parts of rosin and 44 parts of the polyhydric alcohol. There resulted a product which was medium brown in color and which possessed the following properties:

| | |
|---|---|
| Acid number | 135.8 |
| Percent hydroxyl | 6.1 |
| Melting point (capillary) °C | 73 |
| Melting point (ball and ring) °C | 79.4 |

Here again, of course, the melting point would have been increased had the reaction been allowed to proceed further. This, however, is not usually necessary since further esterification takes place at the high temperatures employed in the varnish kettles. Despite the large amount of unreacted material, the melting point was still higher than that of the ordinary glycerol ester gum.

Example 3

In an appropriate vessel was placed 288 parts of methyl ethyl ketone, 780 parts of formaldehyde as paraformaldehyde and 3000 parts of water. There was added slowly with stirring 112 parts of calcium oxide whereupon the temperature rose spontaneously to 50° C. Thereafter cooling was employed so that the temperature would not rise higher and, once the initial exothermic reaction had subsided, the reaction mixture was heated and stirred at 50°–55° C. for two hours. The product was worked up as described in Example 1 for the condensation product of acetone and formaldehyde to yield an almost colorless sirup whose hydroxyl content was of the order of 30%. Because of the procedure used to remove the calcium ion the product was acidic in nature. This acidity could in large part be removed by the use of a basic ion exchange resin such as Amberlite IR–4. The sirupy product was used in the form of an aqueous solution for esterification purposes. The high hydroxyl content of the product together with certain other analytical investigations leads to the conclusion that the product is analogous to the one obtained from acetone whereupon the structure of the chief constituent may be postulated as a desoxyanhydroenneaheptitol II.

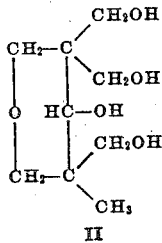

II

The rosin esterification reaction was then carried out similarly to the procedure described in Example 1. In this case 330 parts of gum rosin of grade N was melted with stirring under vacuum after which 65 parts of the condensation product of formaldehyde and methyl ethyl ketone in 40 parts of water was added dropwise. The reaction mixture was heated under vacuum at 265° C. for 4.5 hours. Despite this long period of heating the product which resulted was extremely transparent and light in color and possessed a very high melting point. Its properties follow:

Acid number _____ 80.2
Percent hydroxyl _____ 2.5
Melting point (capillary) _____°C__ 92
Melting point (ball and ring) _____°C__ 98

Example 4

In an appropriate apparatus 500 parts of gum rosin was melted. There was added thereupon at about 180–190° C. with stirring in vacuo 165 parts of the condensation product of formaldehyde and methyl ethyl ketone described in Example 3 in 100 parts of water. After complete addition, the temperature of the reaction mixture was raised to 265° C. and maintained there with stirring and application of vacuum for one hour. The resulting partial ester was capable of emulsifying an oil such as soybean oil when a small amount of it was dissolved in the oil, and the warm solution was treated with water and a few drops of alkali with shaking. The product had the following properties:

Acid number _____ 115.5
Hydroxyl number _____ 128.5
Melting point (capillary) _____°C__ 78

These partial esters have some of the characteristics of ester gums but are usually less desirable for this purpose than the completely esterified products. They do possess unusual properties which make them useful for other purposes. They are particularly useful for further esterification as for example with fatty acids or polybasic acids.

Example 5

The partially esterified ester gum described in the previous example was heated at 265° C. for 30 minutes in order to reduce the acid number somewhat. Then, to 215 parts of it was added 13.2 parts of soybean fatty acids and the mixture was heated and stirred at 220–225° C. for 2.5 hours. There resulted a product which was considerably less brittle than an ordinary ester gum, apparently because of the plasticizing effect of the fatty acids. A product with still more fatty acid groups would be even more highly plasticized. The material exhibited a hydroxyl number of 105.5 and an acid number of 101.9. The product demonstrated a capillary melting point of 77° C. Where the ester is to be used in varnish, it is, of course, unnecessary for esterification to be complete, for the high temperatures employed in varnish cooking serve to drive the reaction forward.

Products such as the one described in this example may be quite valuable in varnish formulations. In some cases in the preparation of varnish and similar coating materials it is advisable to heat a reaction mixture consisting of a glyceride such as soybean oil, linseed oil, dehydrated castor oil, etc. with rosin acid and one of the polyhydric alcohols described in the copending application entitled Condensation of ketones with formaldehyde referred to above. Instead of ordinary gum or wood rosin or abietic acid such materials as polymerized rosin, disproportionated rosin, hydrogenated rosin, or the rosin portions of tall oil may be used. In such a reaction mixture, although the reaction is by nature complex, the glyceride is alcoholyzed yielding a partial fatty acid ester of glycerol and of the above mentioned polyhydric alcohol. The rosin acid serves to complete the esterification of these partial esters, yielding a very desirable coating composition. If desired, a catalyst may be added to aid in the alcoholysis. This may consist of the abietate, naphthenate, stearate, or other fat soluble salt of calcium, cadmium, cerium, strontium, zinc, and the like. The temperatures employed vary from 200–300° C. and the time of reaction may vary from 4 to 16 hours depending on the glyceride employed and the temperature used.

While various modifications of the invention have been described, it will be apparent that the invention is not limited thereto but may be varied within the scope of the appended claims.

I claim as my invention:

1. A rosin acid ester of a polyhydroxy condensation product resulting from the condensation of formaldehyde and a ketone, in which the molal ratio of formaldehyde to ketone is not substantially less than one mole of formaldehyde per mole of active hydrogen in the ketone.

2. An ester gum comprising the ester of a rosin acid and a polyhydroxy condensation product resulting from the condensation of formaldehyde and a ketone, in which the molal ratio of formaldehyde to ketone is not substantially less than one mole of formaldehyde per mole of active hydrogen in the ketone.

3. A rosin acid ester of a polyhydroxy condensation product resulting from the condensation of formaldehyde and acetone, in which the molal ratio of formaldehyde to acetone is not substantially less than one mole of formaldehyde per mole of active hydrogen in the acetone.

4. A rosin acid ester of a polyhydroxy condensation product resulting from the condensation of formaldehyde and methyl ethyl ketone, in which the molal ratio of formaldehyde to methyl ethyl ketone is not substantially less than one mole of formaldehyde per mole of active hydrogen in the methyl ethyl ketone.

5. A rosin acid ester of a polyhydroxy condensation product resulting from the condensation of formaldehyde and cyclohexanone, in which the molal ratio of formaldehyde to cyclohexanone is not substantially less than one mole of formaldehyde per mole of active hydrogen in the cyclohexanone.

6. An ester gum comprising a polyhydroxy condensation product resulting from the condensation of formaldehyde and a ketone, in which the molal ratio of formaldehyde to ketone is not substantially less than one mole of formaldehyde per mole of active hydrogen in the ketone, said condensation product being substantially completely esterified with a rosin acid.

7. A mixed ester comprising a polyhydroxy condensation product resulting from the condensation of formaldehyde and a ketone, in which the molal ratio of formaldehyde to ketone is not substantially less than one mole of formaldehyde per mole of active hydrogen in the ketone, said condensation product being partially esterified with a rosin acid and partially esterified with a fatty acid.

8. A mixed ester comprising a polyhydroxy condensation product resulting from the condensation of formaldehyde and a ketone, in which the molal ratio of formaldehyde to ketone is not substantially less than one mole of formaldehyde per mole of active hydrogen in the ketone, said condensation product being partially esterified with a rosin acid and partially esterified with a polybasic acid.

9. An ester gum comprising a rosin acid ester of anhydroenneaheptitol.

10. An ester gum comprising a rosin acid ester of desoxyanhydroenneaheptitol.

HAROLD WITTCOFF.

REFERENCES CITED

The following references are of record in the file of this patent:

UNITED STATES PATENTS

| Number | Name | Date |
|---|---|---|
| 1,937,533 | Rosenblum | Dec. 5, 1933 |
| 2,303,370 | Kugler et al. | Dec. 1, 1942 |
| 2,340,043 | Clare | Jan. 25, 1944 |
| 2,386,321 | Kroeger et al. | Oct. 9, 1945 |